United States Patent [19]  [11] Patent Number: 4,739,516
Starkloff et al.  [45] Date of Patent: Apr. 19, 1988

[54] FREQUENCY TUNED ANTENNA ASSEMBLY

[75] Inventors: James Starkloff, Columbus; Roger L. van Brackel, Napoleon, both of Ohio

[73] Assignee: A. Van Brackel & Sons, Inc., Defiance, Ohio

[21] Appl. No.: 819,697

[22] Filed: Jan. 17, 1986

[51] Int. Cl.⁴ ............................................. H04B 1/06
[52] U.S. Cl. ................................. 455/269; 455/193; 455/280; 455/291; 343/702; 343/745; 343/872
[58] Field of Search ............... 455/193, 291, 280, 281, 455/269; 343/702, 850, 715, 745, 872, 873

[56] References Cited

U.S. PATENT DOCUMENTS 2,215,810  9/1940  Fener et al.
3,582,791  6/1971  Slavin .................................. 455/291
3,943,524  3/1976  Sample .
4,170,777  10/1979  Liautaud .
4,200,874  4/1980  Harada .
4,247,954  1/1981  Sauer .
4,435,713  3/1984  Gasparaitij et al. ................. 343/873
4,450,588  5/1984  Röhrich et al. ..................... 455/193
4,531,232  7/1985  Sakurai ............................... 343/715
4,623,895  11/1986  Bowering ........................... 343/873

Primary Examiner—Robert L. Griffin
Assistant Examiner—Elissa Seidenglanz
Attorney, Agent, or Firm—Fleit, Jacobson, Cohn & Price

[57] ABSTRACT

A fixed length antenna rod projects from a housing enclosing a pre-amplifier circuit connecting it to the front end of a FM receiver. The antenna rod is mounted at an optimum signal reception attitude by the flange of a bracket to which the housing is secured and through which an output cable terminal of the pre-amplifier circuit extends. The preamplifier circuit is adjustably tuned to favor a specific frequency for subcarrier transmission and attenuated in signal gain to match antenna signal pick-up level.

6 Claims, 2 Drawing Sheets

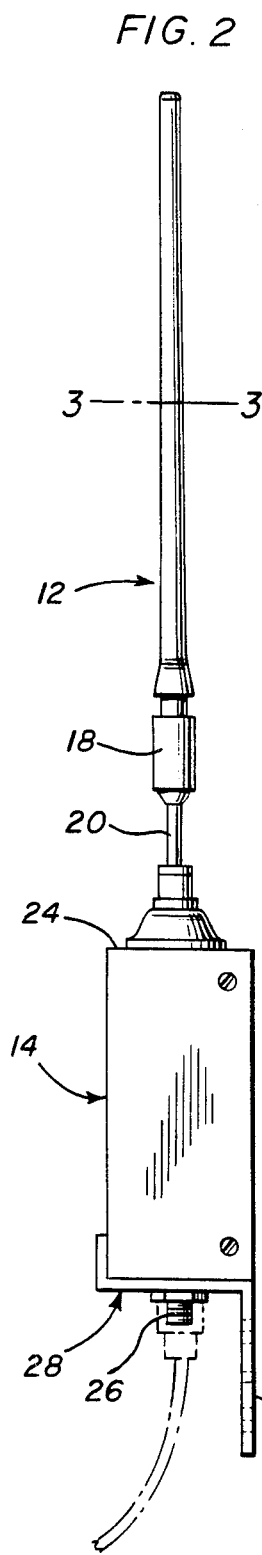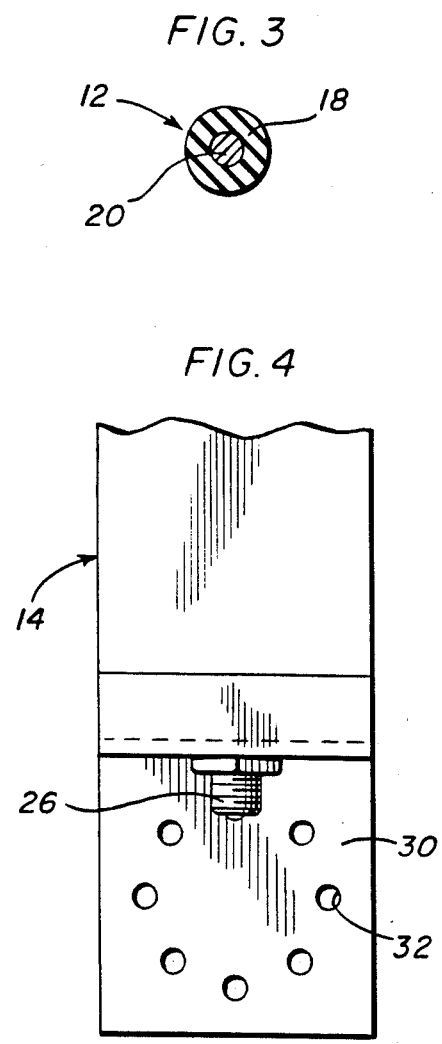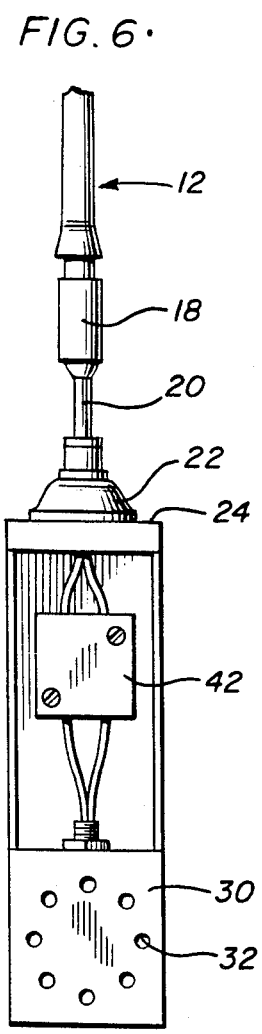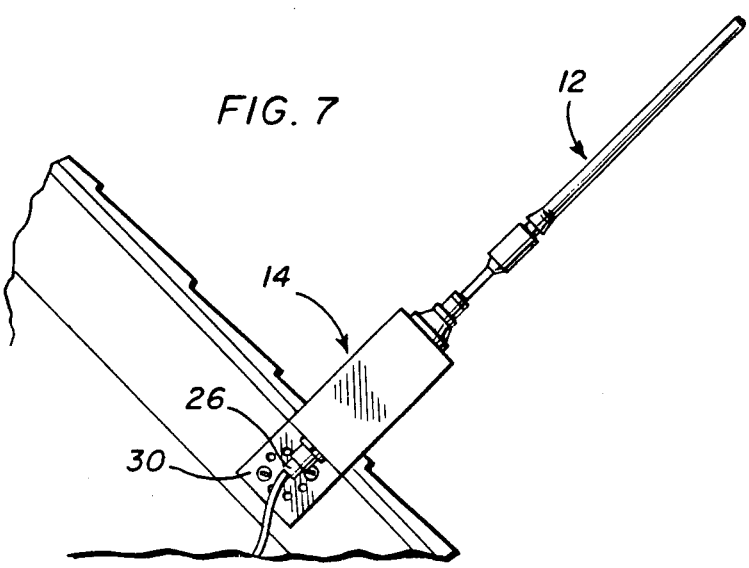

FREQUENCY TUNED ANTENNA ASSEMBLY

BACKGROUND OF THE INVENTION

Field of the Invention

This invention relates in general to a signal receiving antenna assembly and in particular to an antenna primarily designed for FM broadcast frequency band reception.

Subcarrier radio transmissions in the 57 KHz to 99 KHz frequency range piggy backed on the base band frequency of standard FM broadcast frequencies in the 88 to 108 MHz band, are presently used by suppliers of background music, stock market information and other data transmission services. Reception of such subcarrier transmissions is required to be flawless and broadband in nature. With variations in signal level and mounting restrictions, such subcarrier performance for antennas was not heretofore thought to be possible especially without direct ground plane attachment and in poor signal pick-up zones.

It is therefore an important object of the present invention to provide a receiving antenna assembly exhibiting flexibility in coping with different mounting installations and yet providing superior performance with respect to reception of subcarrier transmissions, avoiding multipath effects which heretofore rendered antennas ineffective in high multipath areas.

Yet another object of the invention is to provide an antenna assembly designed for reception of subcarrier transmissions with adjustable tuning and signal gain.

SUMMARY OF THE INVENTION

In accordance with the present invention, a relatively short, fixed length antenna rod element is rubber coated to avoid shorting in close-quarter installations and is connected through an adjustable preamplifier circuit to the front end of an FM receiver. The antenna rod element is mounted in an optimum signal receiving attitude without direct ground plane attachment by a bracket secured to the bottom end of a vertically elongated housing from which the rod element extends. A mounting flange with a circular arrangement of fastener holes depends from the bracket for such purpose. The housing encloses a circuit board on which the pre-amplifier circuit is mounted.

The pre-amplifier circuit is tuned through adjustable inductors associated with input and output loading sections interconnected in parallel by a stabilized amplifier section and a signal coupling network through which transmission at a specific frequency in the subcarrier range is favored and unwanted frequencies rejected. A feedback input is applied to the amplifier section through an adjustable level control circuit from the output side of the signal coupling network to attenuate amplifier gain across the entire FM transmission band to substantially match different signal pick-up levels within the radio broadcast signal region of the transmitter.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

FIG. 2 is a side elevation view of a physical embodiment of the antenna assembly diagrammed in FIG. 1.

FIG. 3 is a section view taken through a plane indicated by section line 3-3 in FIG. 2.

FIG. 4 is an enlarged partial elevation view of the front of the antenna asseembly shown in FIG. 2.

FIG. 6 is a partial rear elevation view of the antenna assembly.

FIG. 7 is an elevation view showing a typical mounting installation for the antenna assembly.

DETAILED DESCRIPTION OF PREFERRED EMBODIMENT

Figure 1:
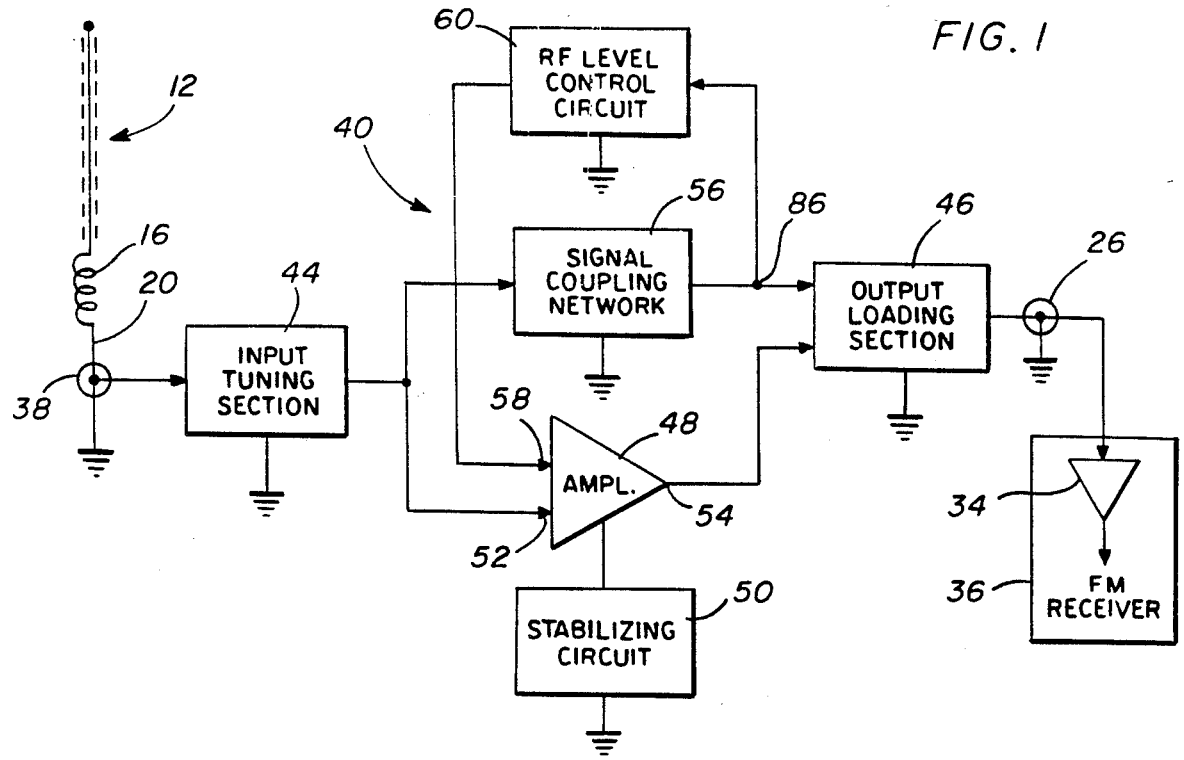
FIG. 1 is a schematic block diagram of an antenna assembly in accordance with the present invention.

Referring now to the drawings in detail, FIGS. 2-4, 6 and 7 show a physical embodiment of a radio signal receiving antenna, generally referred to by reference numeral 10. The antenna includes an elongated rod element 12 that extends from the top end of a tubular enclosure or housing 14, a fixed distance of 17 inches. An inductive loading coil 16 is connected to the rod element which has an electrically non-conductive coating 18, such as rubber. The rod element is supported with its inner core 20 fixed to a base 22 on the top end 24 of housing 14. A coaxial cable terminal 26 extends from the lower end of the housing through a mounting bracket 28 to which the housing is secured. A mounting flange 30 depends from the bracket and has a plurality of holes 32 arranged in a circle. By means of suitable fasteners extending through selected holes 32, the bracket 30 may be fixed in an adjusted attitude on some metallic portion of a building structure, as shown for example in FIG. 7 for indirect ground plane attachment. The antenna is thereby installed vertically, horizontally or at some intermediate angle corresponding to a most favored signal pattern attitude.

The RF signal picked up by the antenna is fed through the terminal 26 by cable to a radio receiver operating on a standard FM broadcast frequency band of 88 to 108 MHz. FIG. 1 shows the terminal 26 connected to the front end amplifier 34 of such a receiver 36 designed primarily for transmission of signals in the 57 KHz through 99 KHz subcarrier frequency range associated with the standard FM broadcast band, to provide flawless data transmission. The receiver cable terminal 26 is therefore connected to an antenna signal terminal 38 within the housing 14 through a pre-amplifier circuit generally referred to by reference numeral 40 in FIG. 1. Such pre-amplifier circuit is mounted within the housing 14 on a circuit board 42 as shown in FIG. 6.

As diagrammed in FIG. 1, the pre-amplifier circuit includes an antenna tuning section 44 and an output load tuning section 46 interconnected in series between the terminals 38 and 26 by an amplifier section 48 having a stabilizing circuit 50 associated therewith. The tuning sections 44 and 46 are adjustably tuned to favor a specific frequency within the broadcast band for the subcarrier transmission aforementioned. Such favored frequency transmission is effected with a signal gain adjusted to substantially match RF signal level pick-up by the antenna element 12 by use of an amplifier section 48 having an input 52 and an output 54 respectively connected to the tuning sections 44 and 46. The tuning section 44 is also connected to the tuning section 46 in by-pass relation to the amplifier section 48 by a signal coupling network 56 which is operative to reject the unwanted signal frequencies on either side of the aforementioned favored frequency within the broadcast band. Toward that end, the output side of the signal coupling network 56 at junction 86 is connected to a signal feedback terminal 58 of amplifier section 48 through a RF level control circuit 60 is adjustable to attenuate amplifier gain across the entire broadcast band in order to achieve signal level match as aforementioned to thereby handle fringe area radio reception at one extreme and high RF pick-up level reception in dense urban areas at the other extreme.

Figure 5:
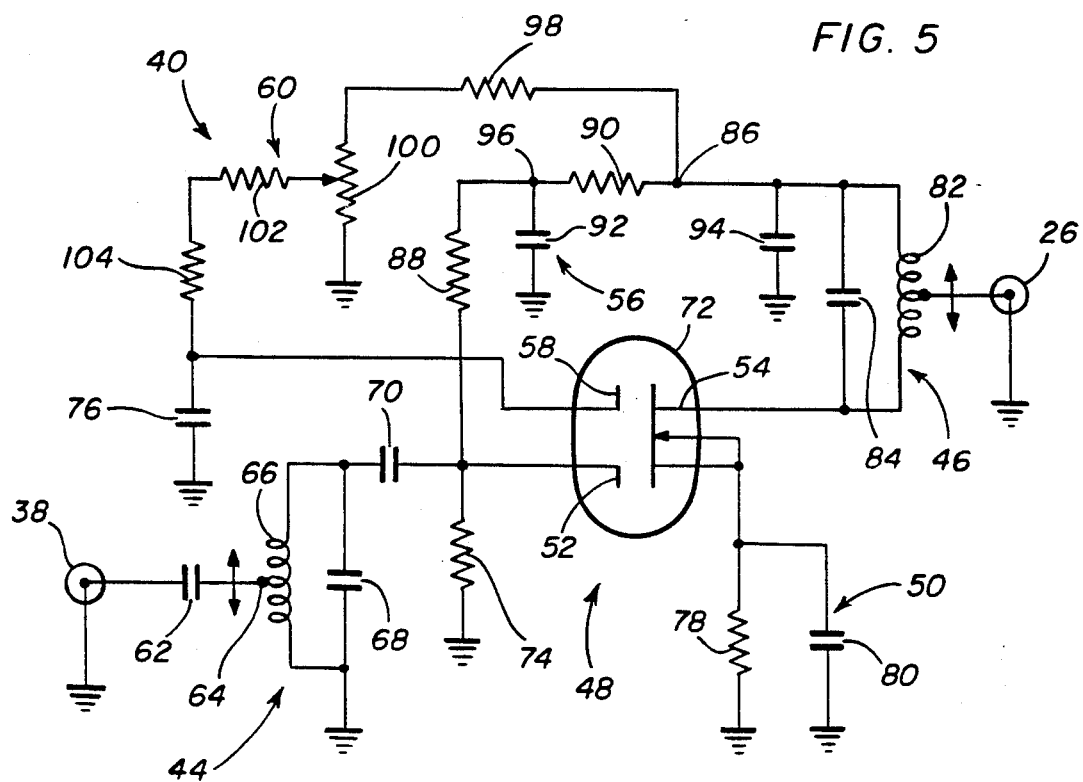
FIG. 5 is a detail circuit diagram of the pre-amplifier circuit associated with the antenna assembly.

FIG. 5 illustrates in greater detail one embodiment of the pre-amplifier circuit 40. The signal picked up by the rubber coated rod element 12 is fed through loading coil 16, terminal 38 and coupling capacitor 62 to the center tap 64 on a grounded, adjustable core inductor 66 of the tuning section 44. The inductor 66 has a capacitor 68 connected thereacross to pass the signal through coupling capacitor 70 to the signal input 52 of the amplifier section 48. The amplifier section is formed by a current control device such as a MOS field effect transistor 72 having two gates constituting the signal input 52 and the feedback input 58. Gate bias for the signal input gate 52 is established by grounded bias resistor 74 while grounded capacitor 76 maintains a desired voltage level on feedback gate 58. The output 54 of transistor 72 is formed by a drain electrode while the source electrodes are connected to the stabilizing circuit 50 formed by parallel, ground connected resistor 78 and capacitor 80. The output drain 54 of transistor 72 is connected to an adjustable core inductor 82 in parallel with a capacitor 84 at one side of the output load tuning section 46, the other side being connected to junction 86 at the signal output side of coupling network 56 passing the incoming signal from capacitor 70. The coupling network includes series connected resistors 88 and 90 with grounded capacitors 92 and 94 respectively connected to junction 96 between the resistors and to junction 86. The output junction 86 of the coupling network 56 is coupled by resistor 98 to the RF level control circuit 60 which includes a grounded potentiometer 100. The adjustable resistance of potentiometer 100 is connected in series with resistor 98 and resistors 102 and 104 to the feedback gate 58 of amplifier transistor 72.

The pre-amplifier circuit 40 is tuned by staggered adjustment of inductors 66 and 82 in order to obtain transmission favoring a specific frequency as aforementioned. Signal level matching is effected by adjustment of potentiometer 100 to vary the gain of amplifier section 48. Such adjustments in combination with optimum antenna orientation for any desired installational location overcomes severe cable line loss to the receiver 36 and increases its front end selectively.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an antenna element and a receiver, a pair of tuning sections pre-adjusted to favor a desired signal frequency, said tuning sections being respectively connected to the antenna element and the receiver, an amplifier device having signal input, feedback input and output terminals, said tuning sections being respectively connected to the signal input and the output terminals of the amplifier device, signal filter means interconnecting the tuning sections in by-pass relation to the amplifier device for suppressing unwanted signal frequencies and feedback signal transmitting means coupling the signal filter means to the feedback input terminal of the amplifier device for attenuating signal gain therethrough.

2. The combination of claim 1 wherein said antenna element is protectively coated with a non-conductive material.

3. The combination of claim 1 wherein said desired signal frequency is within a FM broadcast band.

4. The combustion of claim 3 including a mounting bracket, a signal cable terminal supported by the mounting bracket through which the antenna element is connected to one of the tuning sections and adjustable ground establishing means on the bracket for fixedly positioning the antenna element in an optimum receiving attitude.

5. The combustion of claim 1 including a mounting bracket, a signal cable terminal supported by the mounting bracket through which the antenna element is connected to one of the tuning sections and adjustable ground establishing means on the bracket for fixedly positioning the antenna element in an optimum receiving attitude.

6. In combination with a fixed length antenna element, a RF recevier, a tunable pre-amplifier electrically interconnecting the antenna element and the receiver and a housing enclosing the pre-amplifier and mounting the antenna element thereon, adjustable means for optimizing signal reception by the receiver with respect to a desired broadcast band and a given signal pattern within a relatively high multipath signal transmission zone, comprising angularly adjustable bracket means connected to the housing for establishing ground plane attachment of the antenna element at an attitude favoring said given signal pattern, signal frequency rejection means operatively connected to the pre-amplifier for suppressing unwanted signal frequencies outside of said broadcast band and signal level control means operatively connected to the frequency rejection means and the pre-amplifier for attenuating signal gain through the pre-amplifier to substantially match signal pick-up level within said signal transmission zone, said pre-amplifier including a stabilized amplifier device having input signal and feedback terminals, said input signal terminal being connected to the signal frequency rejection means through which the amplifier device is by-passed, said signal level control means being interconnected between the signal rejection means and the input feedback terminal of the amplifier device.

* * * * *